Figure 1:
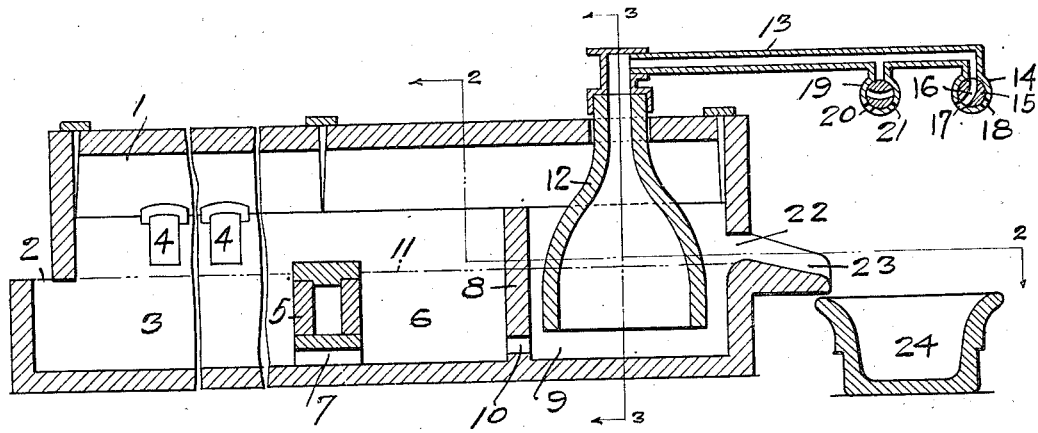

G. E. HOWARD.
GLASS MELTING TANK FURNACE.
APPLICATION FILED AUG. 15, 1913.

1,138,110.

Patented May 4, 1915.
2 SHEETS—SHEET 1.

WITNESSES.
J. R. Keller
S. F. Armstrong

INVENTOR.
George E. Howard
by Kay Totten & Powell
attys

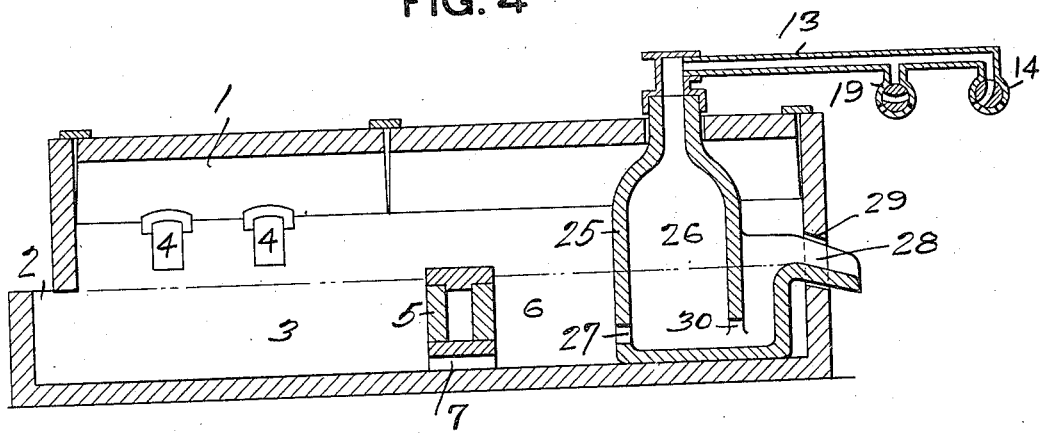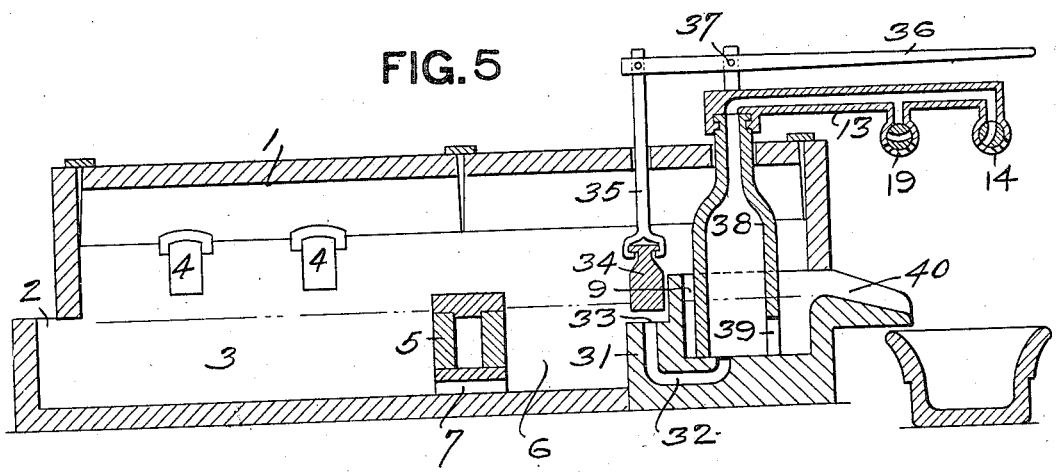

UNITED STATES PATENT OFFICE.

GEORGE E. HOWARD, OF BUTLER, PENNSYLVANIA, ASSIGNOR TO THE PITTSBURGH PLATE GLASS COMPANY, OF PITTSBURGH, PENNSYLVANIA, A CORPORATION OF PENNSYLVANIA.

GLASS-MELTING TANK-FURNACE.

1,138,110.  Specification of Letters Patent.  Patented May 4, 1915.

Application filed August 15, 1913. Serial No. 784,896.

*To all whom it may concern:*

Be it known that I, GEORGE E. HOWARD, a citizen of the United States, and resident of Butler, in the county of Butler and State of Pennsylvania, have invented a new and useful Improvement in Glass-Melting Tank-Furnaces; and I do hereby declare the following to be a full, clear, and exact description thereof.

My invention relates to improvements in glass melting furnaces and is particularly concerned with improvements in the means for delivering molten glass from the furnace tank. The objects of the invention are, first, to provide means for elevating and delivering a quantity of molten glass from the tank without the use of dipping ladles or other devices at present employed. Second, to accelerate the delivery of the molten glass; third, to provide for the delivery of the molten glass in definite pre-determined quantities; fourth, to provide for the delivery of the glass from the tank without causing bubbles, seed or other defects in the glass, which the use of dipping ladles and other means at present employed cause to appear in the glass. Fifth, to provide means for delivering the molten glass from the tank in such manner that the glass may in certain cases flow into or upon a receptacle at a higher level than the level of the glass in the tank, thus providing means for the return of surplus glass to the tank by gravity.

This invention is not concerned *per se* with the means for melting and refining the glass in tank furnaces, as that operation is done in the usual way. Neither does the invention relate to the subsequent working of the glass by rolling, drawing or blowing after it is delivered from the tank.

This application is filed as a continuation in part of my co-pending application Serial No. 767,986.

The glass can be delivered to a pot and thence transferred and poured on a table in the manner now employed by the plate glass and other industries; or, it can be delivered directly on the table without the use of a pot. For use in the manufacture of window glass it can be delivered to a ladle held at the mouth of delivery spout and thence carried to the drawing pots and formed into cylinders in the manner now in use.

For use in the bottle making industry and similar lines employing blowing machines, this invention provides a means for elevation of the glass into a receptacle from which a portion can be returned to the tank by gravity, thereby causing a flow of molten glass in an open receptacle from which the gathering and blowing machines can operate in the manner now employed.

In the plate glass industry the glass is melted in the pots from which it is poured on the casting table. Owing to the clearness required in plate glass it has heretofore been impossible to use a tank furnace from lack of a suitable device to deliver the molten glass free from bubbles and other defects. The use of this device will make the use of tank furnaces practicable for the manufacture of plate glass.

In the manufacture of window glass by machines, tank furnaces are employed and the glass dipped out with ladles. This dipping process causes many bubbles and other defects to appear in the glass which the use of this invention will eliminate.

In the manufacture of machine made bottles, it is necessary to use a revolving pot containing molten glass. This revolving pot is heated by an overhanging furnace and a portion of the pot passes out beyond the furnace wall, thus bringing a fresh portion of molten glass continually to the point where the machine gathers and blows the bottle.

This invention will eliminate the use of the revolving pot thus saving fuel and preventing bubbles and other defects which greatly injure the quality of bottles.

With these objects in view, the invention consists in a construction and arrangement of parts, a preferred embodiment of which is illustrated in the accompanying drawings in which—

Figure 2:
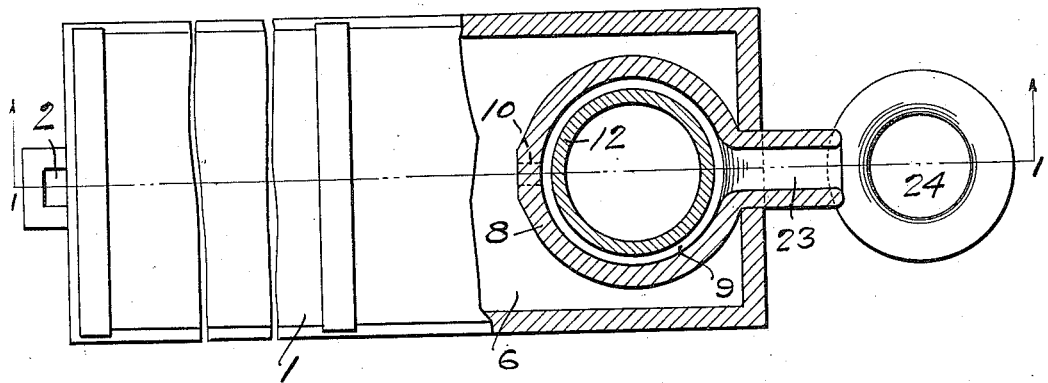
Figure 3:
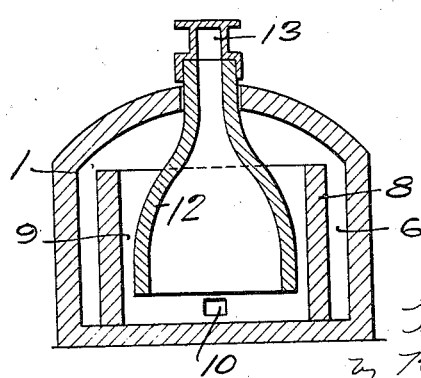

Figure 1 is a longitudinal vertical section of a tank furnace on the line 1—1 Fig. 2; Fig. 2 is a plan view of the tank furnace, the parts being removed and part in section for clear illustration; Fig. 3 is a fragmentary sectional view similar to Fig. 1 showing a modification; and Fig. 4 is a view similar to Fig. 3 showing a further modification, and Fig. 5 is a view of a further modification.

Referring to Figs. 1 and 2, 1 indicates a tank furnace of the usual construction having a receiving opening 2 through which is fed the raw materials of which the glass is composed. 3 is the melting chamber which is applied with heat through ports 4 in the usual manner. The interior of the furnace is divided by a transverse partition wall 5 forming a refining chamber 6 which communicates with the melting chamber 3 by a passage 7. The parts thus far described are and may be of the usual construction of such furnaces. Beyond the refining chamber is a second transverse partition wall 8 forming what may be termed a feed chamber 9 which communicates with the refining chamber by means of a passage 10. The molten glass flows from the refining chamber through the opening 10 into the feed chamber 9 and the molten glass in all three chambers is normally kept as nearly as possible at the uniform level 11. The devices which form the subject matter of this form of my invention comprises a pot or hood 12 of refractory material which extends down into the feed chamber 9, as shown, which hood or pot opens downwardly into the feed chamber by an opening of suitable area, as compared with the passage 10 leading from the refining to the feed chamber. The upper end of this hood or pot is connected by a pipe 13 with a three-way valve 14, the valve plug 15 of which has a passage 16 by which communication may be effected between the pipe 13 and the valve port 17 which in turn may be connected with any suitable source of compressed air; said valve 14 also has a port 18 in communication with the chamber. A similar valve 19 in connection with the pipe 13 is provided with a port 20 connected with a vacuum pump, said valve 19 also having a port 21 opening to the atmosphere. The feed chamber 9 is provided with a discharge outlet 22 located slightly above the normal level 11 of the glass in the furnace and having a delivery spout 23 by which the glass may be delivered either to a casting table 24 or to a pot in which the glass may be carried to the casting table.

In the operation of the form of the apparatus just described, glass is permitted to flow from the refining chamber 6 to the feed chamber 9 and to fill the hood or pot 12 to the normal level 11 of the glass in the furnace, it being understood that during the filling of the hood, both of the valves 14 and 19 are in position to open communication between the pipe 13 and the atmosphere. The apparatus may be operated in either of several ways. First, compressed air may be forced into the hood 12 above the glass therein by suitable operation of the valve 14, which is connected with the source of air pressure thus depressing the level of the glass in the hood, and if desired, expelling all of the glass therefrom according to the quantity of flow required. This causes the level of the glass in the feeding chamber 9 to rise abruptly above the normal level 11, and causes its flow out through the discharge opening 22. A comparatively small portion of glass will be also forced back through the passage 10, but the greater area of the annular space in the feeding chamber around the hood 12 will cause the major part of the glass to seek this path of least resistance. The second mode of operation is as follows: After the hood 12 is filled with glass to the normal level 11 communication may be opened between the hood and the vacuum by means of the valve 19 and pipe 13, thus forming a partial vacuum in the hood which causes the glass in the interior thereof to assume a level somewhat above that of the normal level 11. The valve 19 may be closed and then opened to the atmosphere through the port 21 and the mass of glass within the hood 12 standing above the normal level 11 will in dropping by gravity cause a similar flow of glass from the feeding chamber 9 out through the discharge opening 22. Furthermore, if it is desired to accelerate and augment this feed, the valve 14 may be operated to admit air under pressure to the hood 12, thus expelling the glass therefrom by the combined forces of gravity and said air pressure. The rapid displacement of the glass within the feed chamber 9 will cause the necessary flow out through the discharge opening 22. It is obvious also that the discharge of the glass may be checked at any desired point by suitable inclination either of the valve 14 or the valve 19 according to which of these valves are employed in the operation of discharging the glass. Therefore the discharge may be regulated with the greatest accuracy and at the same time, inasmuch as the mass of glass in the feeding chamber is raised to and discharged from the discharge outlet 22 in the mass, no bubbles or other defects appear in the glass as it is received upon the casting plate or conveyer pot. Furthermore, as the normal level of the glass is below the lower side of the discharge opening 22, the moment the mass of glass within the hood 12 is relieved of the discharge or feeding forces, the surplus glass within the discharge opening flows back into the feed chamber 9 keeping said discharge opening clear at all times.

In the embodiment of my invention illustrated in Fig. 3 the general form and mode of operation is the same but differs from that just described, as follows: Instead of forming a feed chamber within the furnace separate from and within which the feeding hood 12 is located, the hood 25 Fig. 4 has formed integral therewith a pot or chamber 26 which communicates with the refining chamber 6 by means of a restricted opening 27 in the wall of said hood near the bottom. This integral feeding chamber 26 is provided with a discharge spout 28 passing out through a discharge opening 29 in the furnace wall. The operation of this form of my invention is substantially the same as that indicated by the form shown in Figs. 1 and 2, and similarly owes its efficiency to the disproportionate areas of the discharge opening 30 connecting the hood with the feed chamber 26 and outlet spout 28, on the one hand, and the area of the inlet opening 27 on the other, by which the molten glass is admitted to the hood and to the feeding chamber 26.

In the modified form of the invention illustrated in Fig. 5, the partition wall 31 which divides the refining chamber 6 from the feed chamber 9 is provided with a passage 32 opening through a valve seat 33 adapted to be engaged by a valve 34 suspended by valve rod 35 from a valve operating lever 36 having a fixed pivot 37. This passage 32 opens through the bottom of the feed chamber 9 and beneath the feed hood 38. This hood 38 is similarly provided with a valve connection 13 and the feed chamber is provided with the discharge opening 39 and discharge spout 40. With the valve 34 open as shown in Fig. 5 it is evident that the molten glass in the feed chamber 9 will assume the same level as in the refining chamber 6 there being a continuous passage 32 between the same. Wtih this form of the apparatus the operation of delivering the glass from the tank may be accomplished in three ways. The valve 34 is lowered to close the passage 32. Compressed air is then forced into the hood 38 thus depressing the glass in the hood to a level below the normal level 11. This causes the glass in the feed chamber to rise above the normal level and the glass flows through the discharge opening 39 onto the casting table or other suitable receptacle. Second: the valve 34 is held open, as shown, the air pressure valve 14 is shut off and the vacuum valve 19 is opened and a partial vacuum is thus formed in the hood. This causes the glass in the interior thereof to assume a level above the normal level 11. The valve 34 is then closed and cuts off the connection of the refining chamber 6 with the feed chamber 9. The valve 19 is then turned to cut off the connection with the vacuum pump and into communication with the port 21 opening to the atmosphere. The air pressure being then the same both in the hood and in the feed chamber, the level of the glass in the hood will drop, forcing out the glass through the passage 41 at the base of the hood, the consequent displacement of the glass in the feed chamber 9 causing the glass to flow out through the port 39. This flow may be checked obviously by closing the valve 19. Again, the valve 34 may be opened and valve 19 turned to connect the vacuum source with the hood 38. Glass rises in the hood, the valve 34 may then be closed, also the valve 19 closed and valve 14 opened to admit air under pressure to the hood. This forces the level of the glass hood rapidly downward, and through displacement in the feed chamber 9 causes a desired amount to flow through the outlet 39.

It is obvious that the general principle involved in the operation of all forms of the invention is substantially the same, namely, the raising of the portion of the glass in the hood above the normal level of the glass in the feed chamber, and then allowing or causing said glass in the hood to drop with more or less rapidity to cause a corresponding displacement of the glass in the feed chamber and consequent flow through the outlet. It is also obvious that the feed from the outlet may be even more rapidly cut off by opening the communication between the hood and the vacuum pump while the feed is taking place. This will cause an abrupt sucking up of the molten glass into the hood and a consequent quick drop of the level of the glass in the feed chamber. Many practical considerations make the employment of these methods of operation desirable in certain cases. As the discharge opening 39 may be made of considerable size, very rapid delivery of the glass can be accomplished as the air pressure is quick to act.

While I have herein described several embodiments of my invention, it is to be understood that the same is not limited to the forms shown and described, but may be altered in detail and relative arrangement of parts within the scope of the appended claims.

What I claim is:

1. In apparatus of the class described, the combination of a glass melting tank, having a discharge opening, a hood, there being means of communication between said hood and the main supply of glass in said tank, means for opposing return flow of the glass through said communicating means, and means for varying the fluid pressure in said hood, whereby the level of glass therein may be raised above the normal level and means for thereafter depressing the level within the hood to cause a discharge of the glass from said tank through said discharge opening.

2. In apparatus of the class described, the combination with a glass melting tank having a discharge opening, a hood, there being means of constant communication between said hood and the main supply of glass in said melting tank, means for opposing return of the glass through said communicating means, and means for raising the level of the glass in said hood, and means for thereafter depressing the level to cause a discharge of glass from said tank through said discharge opening.

3. In apparatus of the class described, the combination of a glass melting tank having a discharge opening, a hood, there being a means of communication between said hood and tank, means for opposing return of the glass through said communicating means, a vacuum producing apparatus, and an air pressure apparatus in communication with said hood whereby the level of the glass within said hood may be raised and lowered with varied acceleration to cause an increase of the discharge of glass from said tank through said discharge opening.

4. In apparatus of the class described, the combination of a glass melting tank having a constantly communicating chamber provided with a discharge outlet, a hood located in said chamber and constantly communicating therewith in such manner that the level in said hood is normally maintained at the same height as that of the main supply of glass in said tank and chamber, the opening forming communication between said tank and said chamber being less in size than the opening forming communication between said chamber and said hood, and means for varying the pressure in said hood above the glass, whereby the level in said chamber is raised and the glass flows through said discharge outlet.

5. In apparatus of the class described, the combination of a glass melting tank, an inclosing member in said melting tank there being means of constant communication between said member and tank, said member having a discharge opening, means for opposing return flow of the glass through said communicating means, means for creating a partial vacuum in said member whereby the glass is sucked up to a higher level in said member, and when the vacuum is destroyed glass flows from said discharge outlet.

6. In apparatus of the class described, the combination of a glass melting tank, an inclosing member in said melting tank having an outlet constantly communicating therewith and having an outlet, means for opposing return of the glass through said outlet, means for creating a partial vacuum in said member whereby upon destroying said vacuum, a portion of the glass approximately equal to the portion of glass raised in said member above the normal level passes out from said outlet in said member.

In testimony whereof, I the said GEORGE E. HOWARD have hereunto set my hand.

GEORGE E. HOWARD.

Witnesses:
J. GARFIELD HOUSTON,
JOHN F. WILL.